May 29, 1928.

L. FITHIAN

MOLD

Filed Dec. 21, 1925

1,671,674

Inventor
Lon Fithian.

By Eccleston & Eccleston

Attorneys

Patented May 29, 1928.

1,671,674

UNITED STATES PATENT OFFICE.

LON FITHIAN, OF WASHINGTON, PENNSYLVANIA, ASSIGNOR TO HAZEL-ATLAS GLASS CO., OF WHEELING, WEST VIRGINIA, A CORPORATION OF WEST VIRGINIA.

MOLD.

Application filed December 21, 1925. Serial No. 76,766.

This invention relates to mold structures generally, but is more particularly intended for use in glass molding machines where articles are formed having beads, threads, or other external projections around the top thereof; the molds being arranged on a rotating table and adapted to successively receive a plunger for pressing the glass charge, previously deposited into the mold, to the shape of the finished article.

An object of the present invention resides in the provision of a mold of the foregoing type in which the parts are so arranged as to transmit the pressure from the plunger to the base plate of the mold while avoiding undue strain on the neck ring and associated parts, thereby eliminating any tendency to deform the mold sections or joints thereof.

Another object of the invention consists in providing a multi-part mold in which means are employed for centering the mold parts and in which means are also employed for maintaining the parts in proper relation after they become worn through oxidation and the like.

Other objects and advantages of the invention will be apparent from the following description when taken in connection with the accompanying drawings, in which.

Figure 1:
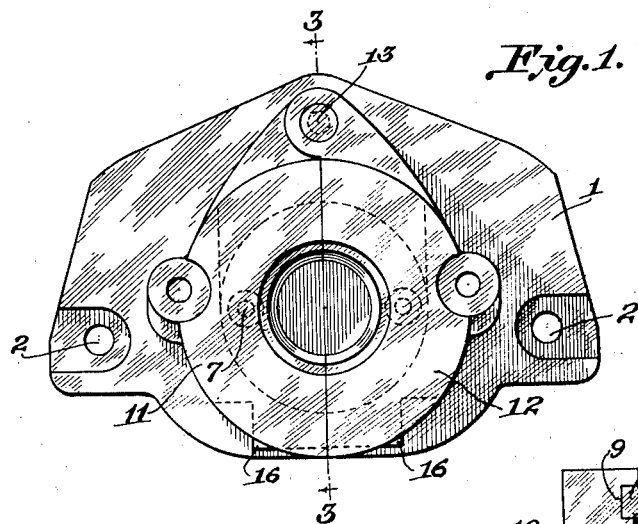
Figure 1 is a plan view of the improved mold in closed position.

Referring to the drawing in greater detail the numeral 1 designates a base plate provided with apertures 2 which afford means for bolting or otherwise securing the plate to the usual mold table (not shown). This plate is also provided with an aperture 3 for the reception of a hinge pintle and a pocket 4 for the reception of a ware ejector; these latter elements being described in greater detail hereinafter.

Figure 3:
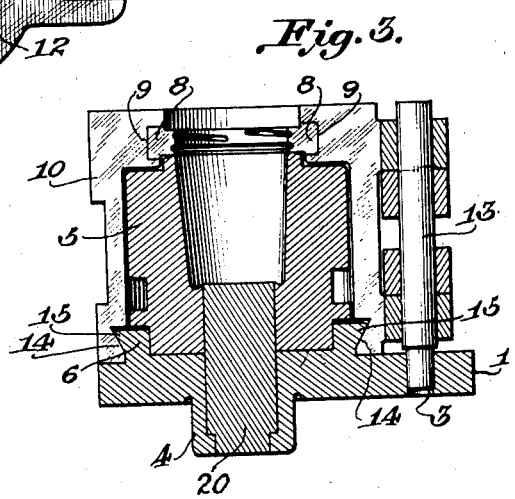
Figure 3 is a vertical section taken on line 3—3 of Figure 1.
Figure 2:
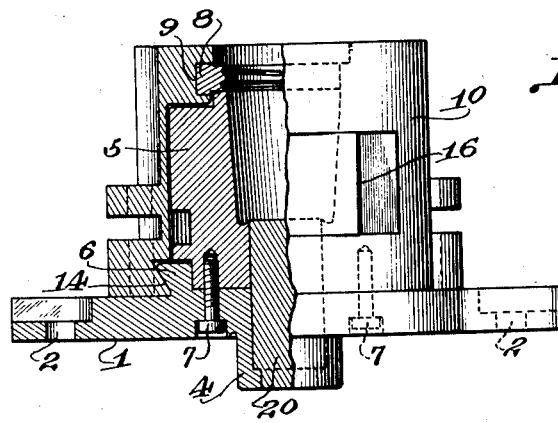
Figure 2 is a front elevation of the mold partly in section.

The main body of the mold consists of a cylindrical mold section 5 in which the glass charge is received and which shapes the major portion of the exterior of the ware being formed. In order that the mold section 5 may be properly centered with respect to the base plate 1 the latter is provided with an integral circular rib 6 which projects a substantial distance above the upper surface of the base plate. As clearly depicted in Figures 2 and 3, the mold section 5 is snugly received within the circular rib 6 and detachably associated therewith by means of the machine screws 7 which are passed upwardly through the base plate 1. Obviously any other form of securing means may equally well serve the purpose.

As hereinbefore stated the present mold is intended for use in the manufacture of glassware having threads or other protuberances on the neck portion thereof. Accordingly a divided neck ring is provided for forming this portion of the ware. The neck ring comprises two semi-circular sections 8 which may be detachably seated in grooves 9 in the neck ring holder 10. This holder comprises complementary sections 11 and 12 which are hinged together by the pintle 13, the latter being received in the aperture 3 of the base plate 1. Each neck ring holder section 11—12 is formed with a beveled inner surface 14 adjacent its lower edge for cooperation with a similar beveled portion 15 on the outer side of the circular rib 6 of the base plate. As the sections 11 and 12 are brought together to position the neck ring 8 into cooperative relation with the cylindrical mold 5 it will be apparent that the co-acting beveled surfaces 14 and 15 will draw the neck ring 8 into proper vertical relation to the mold 5, and clamp the several elements together when the usual clamping means is brought into engagement with the shoulders 16 formed on the sections 11—12.

Figure 4:
Figure 4 is a perspective view of a suitable form of shim adapted to be employed in connection with the mold.

It is well understood by those skilled in the art that glass molds are subjected to considerable wear due to erosion and the like when in use, and that the molds must be frequently cleaned on the interior and at the top in order to remove the oxidized metal. These cleanings gradually wear away portions of the mold and in the present instance in order to compensate for this action and maintain the mold parts in proper relationship shims 17 (Fig. 4) may be used. As the mold 5 wears away these shims may be inserted between the bottom of the mold and the base plate 1 so as to bring the upper part of the mold into proper position with respect to the neck ring 8. The shims 17 are provided with apertures 18 and 19 to permit proper functioning of the bolts 7 and ware ejector 20. It is because of this necessity for adjustment of the mold parts that the circular rib 6 is made of considerable depth, thereby acting as a centering means for the mold 5 even though the latter may be raised a substantial distance above its position shown in Figure 2.

From the foregoing description and the accompanying drawings it will be observed that I have devised a rather simple construction in molds and yet one which is strong and durable in operation, which transmits the pressure from the plunger of the fabricating machine to the base plate of the mold without damage to the relatively delicate neck ring, and one which is readily adjustable so as to compensate for the wearing away of certain parts of the hold.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. The combination, in a glass shaping mold, of a body mold, a neck ring, and means for supporting the neck ring independently of the body mold when in cooperative relation therewith.

2. The combination, in a glass shaping mold, of a body mold, a neck ring, and means normally surrounding said body mold and supporting the neck ring independently thereof.

3. The combination, in a glass shaping mold, of a body mold, a base plate, a neck ring composed of two semi-circular sections, and a neck ring holder comprising two semi-cylindrical sections hinged together and having their lower edges resting on said base plate, said semi-cylindrical sections being formed with neck ring seats above the top of the body mold.

4. The combination, in a glass shaping mold, of a body mold, a neck ring, a neck ring holder for supporting the neck ring independently of the body mold, and means adapted to cooperate with said neck ring holder to clamp said neck ring and body mold in proper vertical relation.

5. The combination, in a glass shaping mold, of a base plate, a body mold and a neck ring independently supported by said base plate when the body mold and neck ring are in cooperative relation.

6. The combination, in a glass shaping mold, of a base plate, a body mold mounted thereon, a neck ring, and means supporting said neck ring above said body mold and independently thereof, said means being in contact with said base plate.

7. The combination, in a glass shaping mold, of a base plate, a body mold mounted thereon, a neck ring, means for supporting said neck ring above said body mold, and means on said base plate cooperating with said first-named means to clamp said neck ring and body mold in proper relation.

8. The combination, in a glass shaping mold, of a base plate, a body mold mounted thereon, a neck ring, a neck ring holder, and cooperating means on said base plate and said neck ring holder for clamping said neck ring and body mold in proper relation.

9. The combination, in a glass shaping mold, of a base plate, a circular rib on said base plate, a body mold mounted on said base plate and confined by said circular rib, a neck ring holder comprising two semi-cylindrical sections hinged to said base plate, a neck ring comprising two semi-circular sections seated in said neck ring holder, and inclined surfaces formed on said rib and said neck ring holder, whereby as the sections of the neck ring holder are moved to closed position the neck ring will be drawn into proper vertical position with respect to said body mold.

10. The combination, in a glass shaping mold, of a base plate, a circular rib thereon, a cylindrical body mold mounted on said base plate and within the circular rib, a neck ring supported above the body mold and independently thereof, and means adapted to be inserted between the bottom of the body mold and the upper surface of the base plate to properly position the body mold with respect to the neck ring.

11. The combination in a glass shaping mold, of a base plate, a body mold and a neck ring independently supported by said base plate, and means for vertically adjusting the body mold.

12. The combination in a glass shaping mold, of a base plate, a body mold and a neck ring independently supported by said base plate, and shims for vertically adjusting the body mold.

LON FITHIAN.

DISCLAIMER 1,671,674.—*Lon Fithian*, Washington, Pa. MOLD. Patent dated May 29, 1928. Disclaimer filed January 5, 1931, by the assignee, *Hazel-Atlas Glass Company*.

Hereby enters this disclaimer:

In all the claims of said patent, your petitioner disclaims any interpretation to the words "body mold", wherever such words appear in the claims, other than to mean a one-piece press mold for cooperation with a pressing plunger.

[*Official Gazette January 27, 1931.*]